United States Patent Office 2,810,753
Patented Oct. 22, 1957

2,810,753

METAL ION CHELATING AGENTS

Frederick C. Bersworth, Framingham Center, Mass., assignor to The Dow Chemical Company, Midland, Mich., a corporation of Delaware No Drawing. Application May 24, 1954,
Serial No. 432,025

7 Claims. (Cl. 260—534)

This invention relates to organic chemistry and has for its object the provision of new type metal ion chelating agents and a method for producing same.

More particularly the object is to provide a method of producing metal ion chelating agents consisting of the compounds chemically identified as di-sulfhydryl alkylene diamine polycarboxylic acids.

A further object is to provide di-sulfhydryl ethylene diamine poly (di to tetra) carboxylic acid metal ion chelating agents.

Other objects will be apparent as the invention is more fully hereinafter disclosed.

In accordance with these objects I have discovered that the disulfhydryl alkylene diamine poly (di to tetra) carboxylic acids conforming to the following generic structural formula are excellent metal ion chelating agents especially for the so-called group of transition metals consisting of Fe, Co, Ni, Mn and Zn in aqueous solutions over a wide range of acid and alkaline pH:

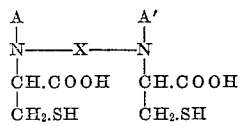

wherein X is a low molecular weight alkylene or cycloalkylene group which interposes 2–3 carbon atoms directly between the nitrogen atoms and is one of the group consisting of

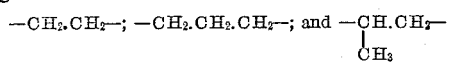

and cyclohexylene and A and A' are the same or different and are selected from the group consisting of H, $CH_2.COOH$, $CH_2CH_2OH$, and alkyl radicals generally having an OH on the second or third carbon atom from the N atom, and the alkali metal salts of the compounds.

The disulfhydryl compounds conforming to the above formula are very powerful water soluble chelating agents for alkaline earth metals and for the transition metals of the group consisting of Fe, Co, Ni, Mn and Zn, the chelate compounds of these latter metals remaining in solution in the presence of these chelating agents over a wide range of acid and alkaline pH. The stability of the chelate complexes of these transition metals in acid and alkaline pH solutions increases with increase in the number of carboxylic acid groups in the sulfhydryl compound within the range of 2 to 4 and for this reason, a preferred disulfhydryl compound for the purposes of the present invention is the compound conforming to the following formula:

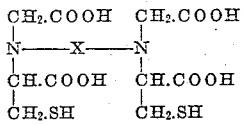

wherein —X— represents a low molecular weight alkylene group, preferably, ethylene ($CH_2.CH_2$) but can be any one of the group consisting of

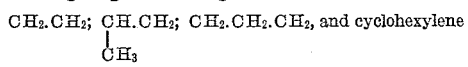

This compound is produced by carboxymethylating the disodium salt of disulfhydryl ethylene diamine dicarboxylic acid, by the process disclosed and claimed in my prior Patent No. 2,407,645 which issued September 17, 1946.

The disulfhydryl ethylene diamine dicarboxylic acid is produced in alkaline pH aqueous solution by reacting two molar weights of the alkali metal salt of cysteine with one molar weight of an alkylene dichloride in alkaline pH solution.

In producing this compound, for example, two molar weights of cysteine hydrochloride are dissolved in 500 cc. of $H_2O$ and sodium hydroxide in an amount required to convert this hydrochloride to the sodium salt and to give a pH of 8 to 10 is added to the solution. One molar weight of ethylene dichloride is added slowly to the solution while the solution is heated to its refluxing temperature and the heating is continued until the two compounds have completely reacted. In substitution for ethylene dichloride I may employ any other ethylene dihalide, such as ethylene dibromide.

Where the corresponding propylene ($CH_3.CH.CH_2$) or trimethylene ($CH_2.CH_2.CH_2$) disulfhydryl compound is desired the dihalide of these compounds should be used in place of the ethylene dihalide in the above example.

The disulfhydryl ethylene diamine tetracarboxylic acid is produced from this dicarboxylic acid by displacing the two amino hydrogens present therein with acetic acid groups according to the carboxymethylation process of my prior patent above identified.

In accordance with this prior process, I add to the reaction solution containing one molar weight of the alkali metal salt of disulfhydryl ethylene diamine dicarboxylic acid, two molar weights of an alkali metal cyanide, preferably sodium cyanide, and sufficient sodium hydroxide to give a pH of about 8.5 to the reaction solution. This solution is then heated to a temperature approximating 80°–85° C. in a container closed to the atmosphere but venting gases from the interior into an ammonia absorption tower through a pressure release valve at a low positive pressure of about 4 to 5 pounds sufficient to exclude atmospheric gases from the reaction solution.

To this heated solution is added slowly two molar weights of formaldehyde in aqueous solution while vigorously agitating the solution, the rate of addition of this formaldehyde solution to the reaction solution being at such a relatively slow rate as will maintain a substantially constant slow rate of evolution of gaseous ammonia ($NH_3$) through the pressure release valve and into the ammonia absorption tower.

After all of the formaldehyde solution has been added to the reaction solution the heating and stirring of the reaction solution is continued for an extended period to permit the reactions involved to go to completion as may be indicated by termination of ammonia evolution into the ammonia tower. The reaction solution then is heated in the open air for a time interval sufficient to strip off the remaining gaseous $NH_3$ from the solution.

The disulfhydryl ethylene diamine tetracarboxylic acid present in the reaction solution is recovered therefrom by acidifying the reaction solution with a strong mineral acid, preferably HCl, to a pH of 3–4 at which the free amino acid is insoluble and precipitates on long standing. The precipitated tetracarboxylic amino acid is recovered from the reaction solution by filtration and is washed with $H_2O$ acidified with HCl to a pH of 3–4 to free it of the reaction solution.

The percent recovery of the tetracarboxylic amino acid (disulfhydryl ethylene diamine tetracarboxylic acid) varies with respect to the care with which the above described process is practiced, but usually will be within the range of 80 percent to 95 percent of the theoretical.

The disulfhydryl ethylene diamine tetracarboxylic acid is a white crystalline product that is somewhat soluble in pure water and is quite soluble in alkaline solutions although it normally will precipitate out of aqueous acid solutions having a pH of 3-4 on long standing. In alkaline pH solutions the acid is converted into the tetra alkali metal salt in the presence of sufficient free caustic alkali. This salt is highly reactive as a metal ion chelating agent particularly towards the group of transition metals above identified and towards alkaline earth metal ions in aqueous alkaline solutions. In acid pH solutions, the sulfhydryl groups act as solubilizing groups holding the acid and metal chelate salts of the acid in solution until the pH of 3-4 and below is reached at which the free acid tends to precipitate on long standing.

The carboxymethylation process when accurately controlled as to temperature and rates of addition of the several ingredients can produce yields which are close to quantitative but, like all organic reactions, it will usually be accompanied by certain side reactions. Generally a technical grade of product containing 80 percent or more of the desired principal chelating agent can be obtained and the reaction product isolated without attempting to isolate the principal chelating agent itself. That is, by merely conducting the reaction in alkaline aqueous medium and maintaining reasonable control over temperature, rate of addition of ingredients and the like, a technical grade of product containing about 80 to 90 percent of the principal compound synthesized will be produced and the remaining impurities in the reaction mass will be related compounds, such as nitrilo acetic acids or sulfhydryl derivatives thereof and polymers of the principal product. The chelation value of the reaction product thus made, generally is greater than that which is attributable to the principal compound being synthesized and exceeds that value by 10 to 20 percent. Accordingly, the reaction product as such is a useful one obtained directly from the process and is usable as a technical grade of the compound being synthesized.

It is believed apparent that the substitution of propylene dihalide or trimethylene dihalide for the ethylene dihalide in the above specific example will produce the corresponding disulfhydryl propylene and trimethylene tetracarboxylic acids and requires no material change in the process described in the above specific embodiment of the invention. Each of these compounds is recovered from the reaction solution in substantially the same way.

The structural formulas for each of these compounds are, respectively:

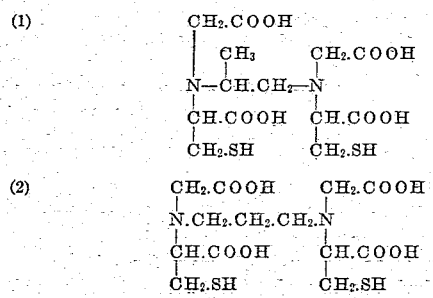

By displacing only one of the remaining amino hydrogens of the disulfhydryl alkylene diamine dicarboxylic acid with an acetic acid group by the method of my prior patent (above identified) by using only one equivalent molar weight of alkali metal cyanide and formaldehyde in the process, the disulfhydryl alkylene diamine tricarboxylic acids may be obtained conforming to the following generic formula:

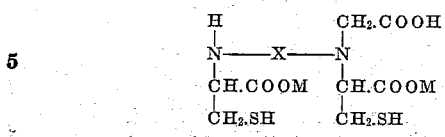

in which X may be a low molecular weight alkylene or cycloalkylene which interposes 2-3 carbon atoms directly between the nitrogens and is one of the groups consisting of

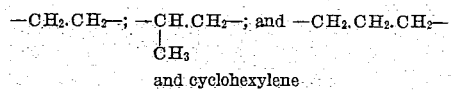

and cyclohexylene

The introduction of alcoholic groups into the molecule is accomplished by reaction of the disulfhydryl alkylene diamine dicarboxylic acid with ethylene oxide in alkaline medium in appropriate molar amount to give the mono- or di-ethanol derivative:

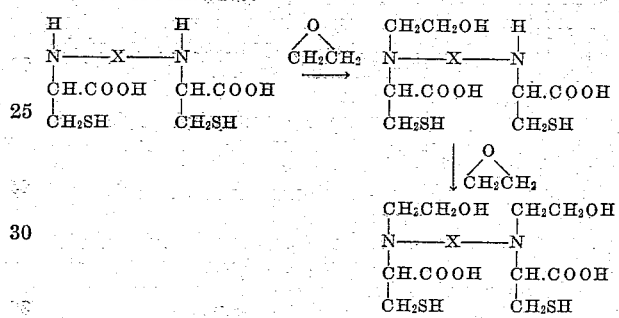

The tricarboxylic amino acids are also strong chelating agents towards the transition metals of the group above identified. The recovery of these acids from the reaction solution differs somewhat from that of the tetracarboxylic acid compounds since they are more soluble in the acid form and can be effected in the following manner:

The reaction solution containing the trisodium salt of the disulfhydryl alkylene diamine tricarboxylic acid is evaporated, preferably at low temperatures in high vacuo, to small volume and anhydrous ethanol is added to the solution in sufficient amount to precipitate the trisodium salt therefrom. This usually requires a 100 percent dilution of the solution with the anhydrous ethanol. The pale yellow salt recovered thereby is washed with anhydrous (absolute) ethanol to remove the last traces of caustic soda present therein.

The trisodium salt is then converted into the triacid by adsorption of the salt in an anion exchange column, washing with water and then with 6N.—HCl solution. The free tricarboxylic amino acid thus obtained is recovered from the acids pH solution by evaporating off the water of solution to small volume and to syrupy consistency and allowing it to crystallize therefrom on long standing. The percent recovery of the tricarboxylic amino acid by this method varies widely depending upon the care with which the process is practiced.

In these disulfhydryl alkylene diamine polycarboxylic acids of the present invention the sulfhydryl groups are important acid chelating groups and tend to stabilize the chelate compounds of the transition metals, especially the cobalt and nickel chelate compounds. The affinity of these chelating agents for these metal ions is quite high as compared to other chelating compounds (those not having these sulfhydryl [SH] groups). These sulfhydryl compounds also form quite stable chelate compounds with the platinum groups of metals which are exceedingly difficult to chelate.

This application is a continuation in part of my prior filed application Serial No. 273,358, filed February 25, 1952, which in turn is a continuation in part of my application Serial No. 119,009, filed September 30, 1949, both applications now abandoned.

Having hereinabove described the present invention generically and specifically and given several specific embodiments of the same, it is believed apparent that the invention may be widely varied without essential departure therefrom and all such modifications and departures therein are contemplated as may fall within the scope of the following claims.

What is claimed is:

1. The compound disulfhydryl alkylene diamine polycarboxylic acid having from 2 to 4 carboxylic groups and conforming to the following structure:

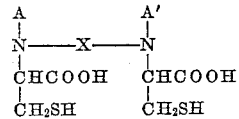

wherein X is a low molecular weight group which interposes 2–3 carbon atoms as spacers directly between the nitrogen atoms and is selected from the group consisting of —CH$_2$CH$_2$—; —CHCH$_2$—; —CH$_2$CH$_2$CH$_2$—, and cyclohexylene
　　　　　　　　|
　　　　　　　CH$_3$ and wherein A and A′ are selected from the group consisting of H, CH$_2$COOH, and CH$_2$CH$_2$OH, and may be the same and the alkali metal salts of the said compound.

2. The compound disulfhydryl ethylene diamine dicarboxylic acid conforming to the following structure:

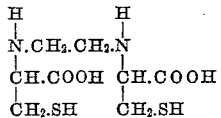

3. The compound disulfhydryl ethylene diamine tricarboxylic acid conforming to the following structure:

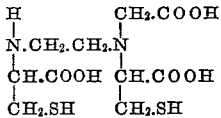

4. The compound disulfhydryl ethylene diamine tetracarboxylic acid conforming to the following structure:

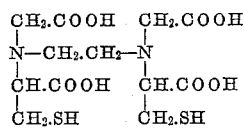

5. The compound disulfhydryl trimethylene diamine tetracarboxylic acid conforming to the following structure:

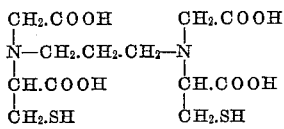

6. The compound disulfhydryl isopropylene diamine tetracarboxylic acid conforming to the following structure:

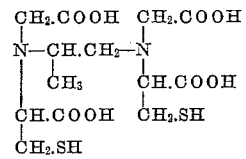

7. The method of making disulfhydryl alkylene diamine dicarboxylic acids and alkali metal salts conforming to the structure:

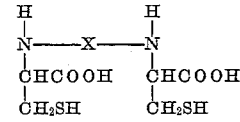

wherein X is one of the group consisting of

CH$_2$CH$_2$; CHCH$_2$; CH$_2$CH$_2$CH$_2$ and cyclohexylene
　　　　　|
　　　　CH$_3$ which comprises reacting two molar weights of an alkali metal salt of cysteine with one molar weight of an alkylene dihalide selected from the group consisting of ethylene, isopropylene, trimethylene and cyclohexylene dihalides in alkaline pH solution.

No references cited.